Sept. 25, 1928.
J. EIGE
1,685,527
JOURNALING MEANS FOR HOLLOW FLOAT ARM SHAFTS
Filed Dec. 27, 1927
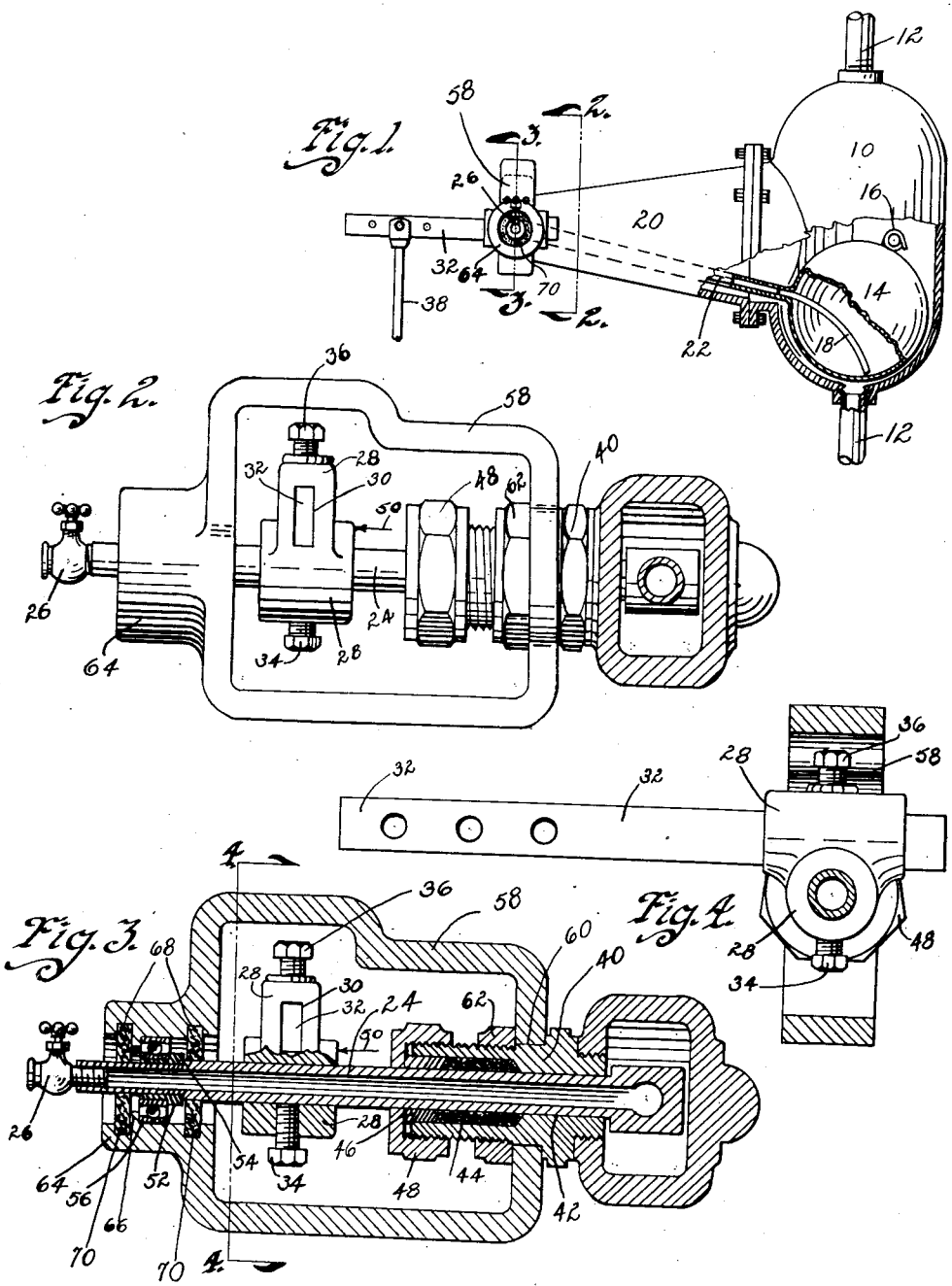
Witness
Phil Harrison
Inventor
Jacob Eige
by Bair & Freeman Attorneys Patented Sept. 25, 1928.

1,685,527

UNITED STATES PATENT OFFICE.

JACOB EIGE, OF MARSHALLTOWN, IOWA, ASSIGNOR TO THE FISHER GOVERNOR COMPANY, OF MARSHALLTOWN, IOWA.

JOURNALING MEANS FOR HOLLOW FLOAT-ARM SHAFTS.

Application filed December 27, 1927. Serial No. 242,623.

The object of my invention is to provide a journaling means for a hollow float arm shaft designed to minimize friction and being of simple, durable, and comparatively inexpensive construction.

More particularly it is my object to provide such a journaling means for a hollow shaft extending from a float arm casing in which is mounted a float connected by a float arm to the hollow shaft. The float itself is hollow so that it can be made of metal and yet will float in a liquid and in order to drain any condensation from the float the float arm is hollow and communicates with the hollow shaft whereby a valve may be mounted on the outer end of this shaft and opened when it is desired to expel condensation from the float.

A further object is to provide such a journaling means in the form of a boss on the float arm casing to which is secured a frame for supporting a ball bearing of the annular and thrust type at a point spaced from the boss, the shaft extending through the boss and through the ball bearing whereby it is held in proper alignment at all times and friction of the working parts is minimized.

With these and other objects in view my invention consists in the construction, arrangement and combination of the various parts of my device, whereby the objects contemplated are attained, as hereinafter more fully set forth, pointed out in my claims and illustrated in the accompanying drawings.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a side elevation of a float cage and float arm casing with my improved type of journaling means applied thereto, part of the float cage being broken away and shown in section.

Figure 2 is an enlarged sectional view on the line 2—2 of Figure 1 showing my journaling means in side elevation.

Figure 3 is an enlarged sectional view taken on the line 3—3 of Figure 1 illustrating the journaling means in cross section; and Figure 4 is a detail sectional view on the line 4—4 of Figure 3.

On the accompanying drawings I have used the reference numeral 10 to indicate a float cage. The float cage 10 is provided with connecting pipes 12 adapted to be connected to a liquid storage tank whereby the liquid in the tank will enter the float cage 10 for the purpose of operating a float therein. The float is indicated by the reference numeral 14 and is of the hollow globe type. Sometimes it is desirable to make the float 14 of thin aluminum so that it will float in a liquid such as gasoline having a low specific gravity. In some instances, however, there is considerable pressure in the storage tank and consequently in the float cage 10 which would have a tendency to collapse the float 14 if provision was not made to equalize the pressures inside and outside of the float. For equalizing this pressure a coiled tube 16 is provided which communicates with the inside of the float 14 so that the pressure therein will correspond to the pressure within the cage 10. The tube 16 is coiled and its free end directed downwardly to prevent the liquid entering the float 14 when it is splashed in the cage 10.

Even when no liquid is splashed into the float, condensation may form on the inside thereof and collect after a period of time in sufficient volume to render the float heavier than desired. A discharge tube 18 therefore has been provided to collect this condensation from the bottom of the float 14 in a manner hereinafter to be described.

Secured to the float cage 10 is a float arm casing 20. The float arm casing 20 is adapted to contain a float arm 22 connected to the float 14. The float arm 22 is connected with a shaft 24 extending from the side of the casing 20. Both the float arm 22 and the shaft 24 are hollow and the float arm 22 is designed to receive one end of the tube 18 so that the condensation collected by the tube may flow through the arm 22 and the shaft 24 to the exterior of the casing 20. For controlling the flow of such condensation, a valve 26 is provided. The valve 26 is screwed into the outer end of the shaft 24.

From the foregoing description it will be obvious that any condensation in the float 14 may be discharged through the valve 26 by merely opening the valve. This occurs because of the pressure within the cage 10 which enters the float 14 through the tube 16 and forces the condensation therefrom. A float of this character can be used only in installations where there is a pressure within the cage 10, or where a vacuum pump is connected to the valve 26.

A hub 28 is secured to the shaft 24 and is provided with an opening 30 in which is slidably mounted a bar 32. The hub 28 is fixed relative to the shaft by a set screw 34 and the bar 32 is fixed relative to the hub 28 by a set screw 36. The bar 32 is connected by a link 38 to a valve or other device adapted to be controlled by the level of the liquid within the cage 10.

I have provided a journaling means for the shaft 24 of the foregoing described structure and this journaling means comprises a boss 40 screwed into the side of the casing 20. The boss 40 is provided with an opening 42 through which the shaft 24 rotatably extends. Packing 44 surrounds the shaft 24 and is received in a socket formed in the boss 40. A packing gland 46 is also received in the socket in the boss and is adjustably forced against the packing 44 by a packing nut 48. In this manner a seal between the boss 40 and the rotatably mounted shaft 24 is provided.

Since there is a pressure within the float arm casing 20 there is considerable pressure on the shaft 24 causing end thrust of this shaft in the direction of the arrow 50. I have provided a bearing for the outer end of the shaft 24 which efficiently takes care of this end thrust and furthermore provides a bearing for the outer end of the shaft to insure proper alignment of the shaft in the opening 42 of the boss 40 so that the danger of binding is entirely eliminated. The bearing construction comprises a sleeve 52 mounted on a reduced portion of the shaft 24 and contacting with a shoulder 54 formed thereon. The sleeve 52 is also provided with a shoulder and a ball bearing 56 is mounted on the sleeve against the shoulder. The ball bearing 56 is of the combination annular and end thrust type whereby it best suits the purpose of this invention.

For supporting the bearing 56 I provide a frame 58 generally rectangular in shape. The frame 58 has an opening 60 adapted to fit over the boss 40 and secured thereto by a lock nut 62. The other end of the frame 58 is provided with a boss 64 having a shoulder 66 against which the ball bearing 56 engages. This construction allows the end thrust of the shaft 24 in the direction of the arrow 50 to be taken up by the shoulder 54, sleeve 52 and the shoulder 66 through the bearing 56.

For preventing foreign matter such as dirt from getting into the bearing 56 I provide a pair of grooves 68 formed in the hub 64 and felt washers 70 are mounted in grooves 68 for this purpose. The washers 70 span the space between the grooves 68 and the shaft 24.

In the use of a device of this character it is often necessary to make very delicate adjustments of the float 14 relative to the valve or other device controlled by the position of the float and it is therefore desirable to eliminate friction as much as possible.

The bearing 56 serves admirably to accomplish this result.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A device of the character disclosed comprising a hollow float arm, a float arm casing receiving the float arm, a journal extending from the side of said casing, a hollow shaft extending through said journal and connected with the float arm, a frame projecting from said casing, a ball bearing supported in said frame and spaced from said journal, said hollow shaft extending through said ball bearing and a valve on the outer end thereof.

2. A device of the character disclosed comprising a hollow float arm, a hollow float attached thereto, a casing receiving the float and the float arm, a journal extending from the side of said casing, a hollow shaft extending through said journal and connected with said float arm on the inside of said casing, a frame projecting from said casing, a ball bearing of the annular and thrust type supported in said frame and spaced from said journal, said hollow shaft extending through said ball bearing and a valve on the outer end thereof.

3. In combination with a float arm casing having a hollow shaft extending therefrom and adapted to be connected with a hollow float arm, means for journaling said shaft comprising a boss extending from the side of said casing, a frame secured to said boss and having a bearing, said shaft extending through said bearing and being provided with a valve on its projecting end.

4. In combination with a float arm casing having a hollow shaft extending therefrom and adapted to be connected to a hollow float arm, means for journaling said shaft comprising a boss extending from the side of said casing, a frame secured to said boss and supporting a ball bearing, said shaft extending through said ball bearing and being provided with a valve on its projecting end, said ball bearing being provided for both journalling the outer end of said shaft and for taking the end thrust thereon caused by pressure within the casing.

5. In combination with a float arm casing having a hollow shaft extending therefrom and adapted to be connected with a hollow float arm, means for journalling said shaft comprising a boss extending from the side of said casing, a frame secured to said boss and supporting a ball bearing, said shaft extending through said ball bearing and being provided with a valve on its projecting end, annular grooves formed in said frame on each side of said ball bearing and felt washers in said grooves and spanning the space between the grooves and the shaft for excluding dirt from the ball bearing.

6. In combination with a float arm casing having a hollow shaft extending therefrom and adapted to be connected with a hollow float arm, means for journalling said shaft comprising a boss extending from the side of said casing, a frame secured to said boss and supporting a ball bearing, said shaft extending through said ball bearing and being provided with a valve on its projecting end, a shoulder in said frame; said ball bearing contacting with said shoulder whereby end thrust of the shaft caused by pressure within the casing will be counteracted by said frame.

7. The combination with a casing, a hollow float therein having a hollow float arm, a hollow shaft connected to said float arm and extending from said casing and a valve on the projecting end of said shaft, of a journaling means for said shaft comprising a bearing on said casing, a frame secured to said casing, an annular and thrust ball bearing carried by said frame, said hollow shaft extending through said bearings, said shaft having a shoulder thereon for engaging said ball bearing.

8. The combination of a casing with a frame projecting therefrom, a hollow float in the casing, a hollow float arm communicating therewith, a hollow shaft connected with said arm, projecting from the casing and journaled on the casing and the frame at spaced points.

9. The combination of a casing with a frame projecting therefrom, a hollow float in the casing, a hollow float arm communicating therewith, a hollow shaft connected with said arm, projecting from the casing and journaled on the casing and the frame at spaced points, and a controlling valve for said shaft.

JACOB EIGE.